G. CHILSON.
Cooking Range.

No. 22,489.

3 Sheets—Sheet 1.

Patented Jan. 4, 1859.

G. CHILSON.
Cooking Range.

No. 22,489.

3 Sheets—Sheet 2.

Patented Jan. 4, 1859.

G. CHILSON.
Cooking Range.
No. 22,489.
3 Sheets—Sheet 3.
Patented Jan. 4, 1859.
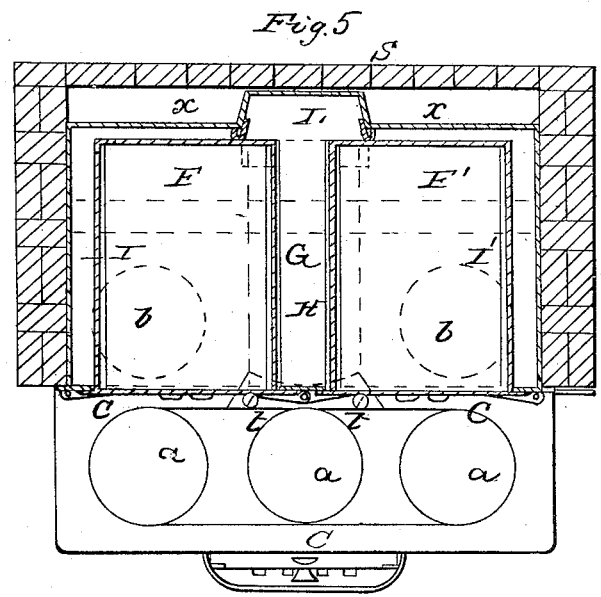
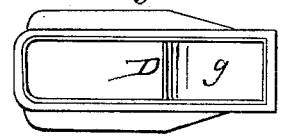 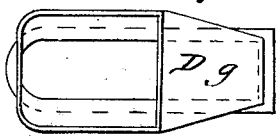
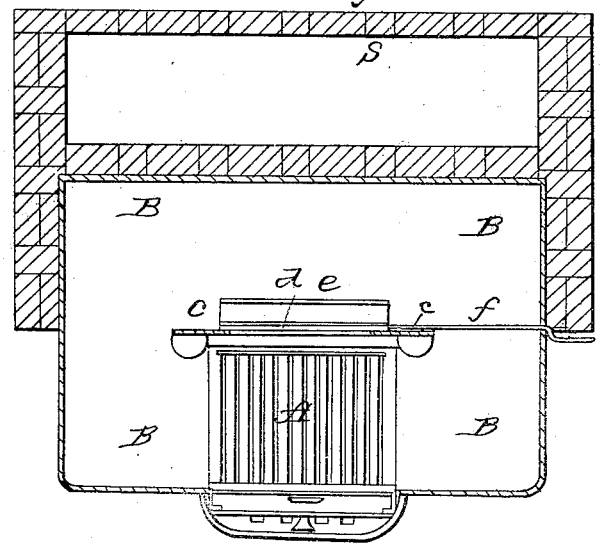

UNITED STATES PATENT OFFICE.

GARDNER CHILSON, OF BOSTON, MASSACHUSETTS.

COOKING-RANGE.

Specification of Letters Patent No. 22,489, dated January 4, 1859.

*To all whom it may concern:*

Be it known that I, GARDNER CHILSON, of Boston, in the county of Suffolk and State of Massachusetts, have invented an Improved Cooking-Range; and I do hereby declare that the same is fully described and represented in the following specification and the accompanying drawings, of which—

Figure 1:
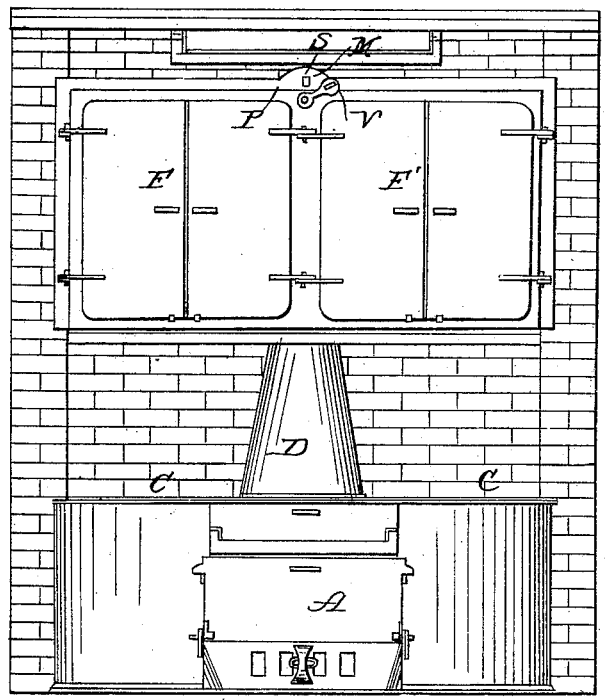
Figure 2:
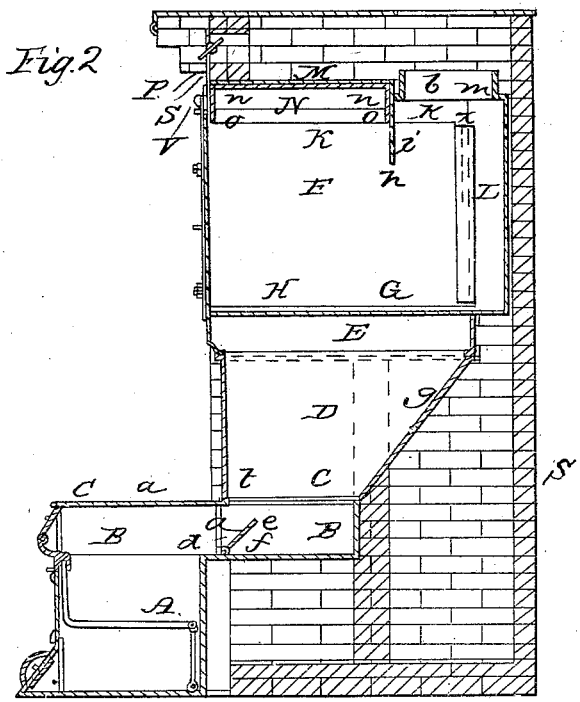
Figure 4:
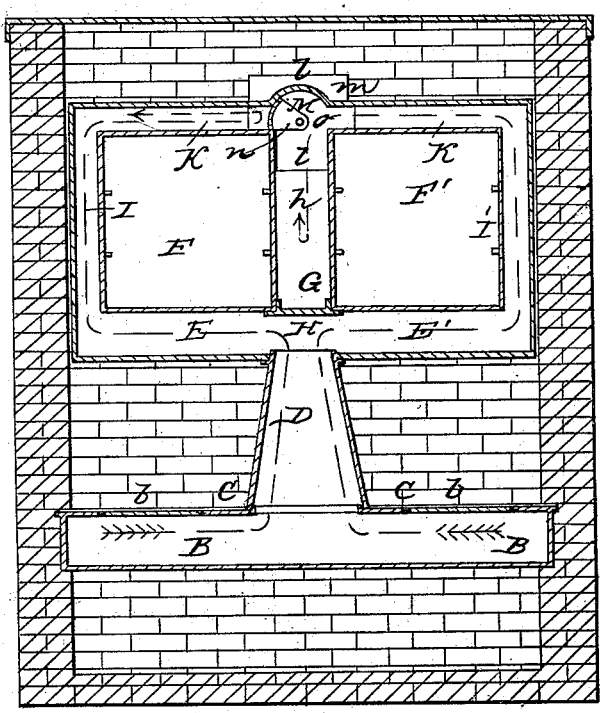
Figure 3:
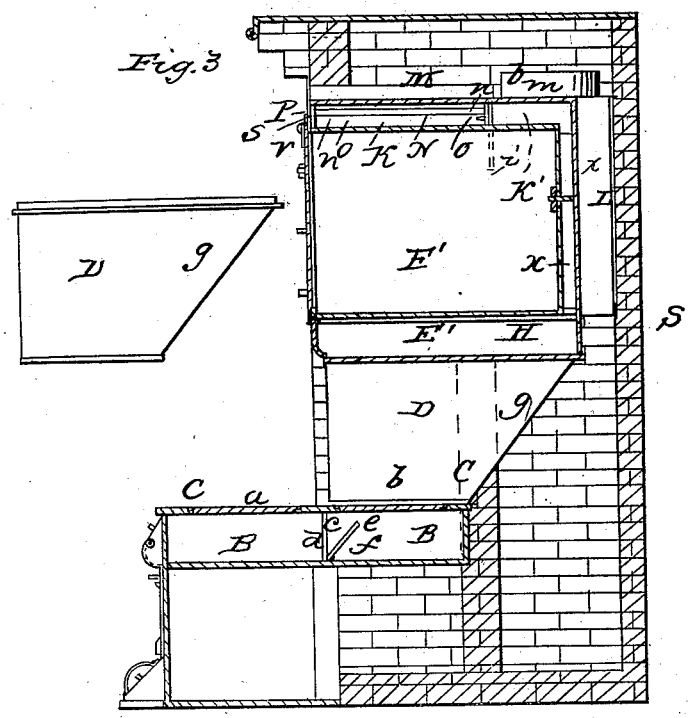

Figure 1, is a front elevation of it. Fig. 2, a vertical, central and transverse section of it. Fig. 3, a vertical and transverse section taken through the middle of one of the ovens. Fig. 4, is a vertical and longitudinal section taken through the two ovens and the tapering reflecting flue leading upward from the flue space in rear of the fire-place. Fig. 5, is a horizontal section taken through the two ovens.

From personal observation as well as the general complaint of persons using ranges for some years past, I have become fully convinced of the reasonableness of the objections urged against their use, viz., the great waste of fuel and unreasonable length of time required for baking and other culinary purposes, the same very clearly showing that too little attention has been given to the proper improvement of the cooking range, that indispensable fixture of every well regulated kitchen. Several years since I invented a new mode of construction of cooking ranges, the introduction of which I have delayed until the present time (the perfection and introduction of my "cone" furnace for heating buildings having in the meantime fully occupied my attention) I have now completed and fully developed the principles combined in my new range and having thoroughly tested its working, I find it to be complete and perfect in its operation, in baking and all the other culinary purposes required of a range, and have further and satisfactorily proved its really wonderful economy in the consumption of fuel relatively to many, if not all the most approved ranges. The whole apparatus now seems to meet fully the essentials constituting a perfect cooking range.

The nature of my invention or improvement consists. First, of a peculiar mode of making the upright flue leading from the fire place or the flue space in rear of the same to the flue space or spaces about the ovens. Next, in an arrangement and application of a curved valve or damper and recess with reference to the diving and top flues of the ovens. Next, in the application and arrangement of a protector plate with reference to the fire-place, the two ovens and the flues between and in rear of the ovens, and so as to support the ovens and protect them in manner as hereinafter described. Next, in the application and arrangement of an expansion plate with respect to the fire-place and upright flue thereof and the top plate of the boiling chamber. Next, in a peculiar arrangement of the flues about the two ovens.

The range on which my invention is based is one usually termed an "upright or elevated oven range" and has two ovens which are arranged above the fire-place the boiling chamber and spaces for boiling.

In the drawings, A, denotes the fire-place, which opens into a boiling chamber B, whose cap or top plate C, is furnished in the usual way with surfaces, $a$, $a$, $b$, $b$, for the reception of boilers or kettles. Out of the rear half or part of the boiling chamber, a tapering reflecting flue, D, leads and extends upward and opens into the flue space E E' underneath the ovens F, F' which are arranged a short distance apart from one another and with a flue space, G, between them. The bottom of such space is composed of a protector plate, H, which is situated directly over the upper end of the flue D and serves not only as a bottom to the flue, but to support the two ovens (whose inner lower corners rest on the plate as shown in Fig. 4,) and to protect them as hereinafter described.

The boiling chamber, B, is divided by a division plate, $c$, disposed directly in rear of the fireplace. This division plate as shown in Fig. 6, (which is a horizontal section of the range and is taken through such plate) terminates at its ends at considerable distances from the ends of the boiling chamber. It also has a passage or opening, $d$, made through it and just in rear of the fireplace and provided with a damper or valve, $e$, so connected to a cranked rod, $f$, as to be capable of being turned up to close the passage, or down to open it as circumstances may require. When the valve $e$, is turned up so as to close the passage, $d$, the smoke from the fireplace will be made to course around the ends of the partition and under the back boilers before it may enter the upright flue. But, when the valve is turned down, the smoke from the fireplace passes through the opening, d, and into the said flue.

In constructing the tapering flue, D, it should be made with a reflecting inclined back g, also with a mouth at bottom about square and with an opening at its upper end extending entirely or nearly from front to rear of the oven, and having a superficial area equal to or about equal to the opening at its lower end. Fig. 7, is a top view and Fig. 8, a bottom view of this flue. This mode of making the flue enables it to receive and deliver much more heated smoke and volatile products of combustion than would be the case were its opposite sides parallel and vertical and with a space between them equal to the width of the opening at the top of the flue. Other advantages of this improvement will be hereinafter enumerated.

The horizontal flue space E, or E′, underneath each oven leads into an upright flue, I, or, I′, extending up alongside the outerside of the oven and from thence into a horizontal flue space, K, K′, disposed on the top of the oven and leading directly into the diving flue or flue space, G, which in its turn and by a passage, h, under a vertical division plate, i, opens into an upright flue, L, arranged in rear of the flue, G, and portions of the rear end of the ovens. The upright flue, L, has a round opening, l, at top, terminating in a neck, m, for a discharge pipe should occasion require such to be employed. If not, the opening of the said neck may communicate with a chimney.

Directly over the flue, G, is an arched recess, M, for the reception of a curved valve, N, the width of which is equal to or a little greater than the distance between each edge of the arched recess and the inner upper corner or edge of the next adjacent oven. The two ends of the curved valve are affixed to two sectors or radial arms, n, n, which have journals and bearings therefor at their lower ends as seen at, o, o. One of the said journals projects through the oven door opening frame p, and has a catch, r, fastened to it to take into a notched projection s formed on the said front plate, the said plate and front catch serving to hold the valve up within the recess, M, when necessary. By turning the curved valve down upon either oven it will cut off the passage of smoke from the top flue of the oven down into the diving flue, G, leaving the whole current of smoke and heated volatile products of combustion to pass around the other oven and thence down into the diving flue, G, and from thence into the upright flue, L. When the curved valve N, is elevated within the arched recess M, the currents of smoke can course freely about both ovens and into the diving flue between them.

That part of the top plate, C, in front of the upright tapering flue, D, is formed with a flaring or dovetail opening for the reception of a similarly shaped separate plate, t, which may be termed the safety expansion plate. It should be applied to the plate, C, by screws and nuts, and in such manner as to enable it to expand and contract lengthwise as well as widthwise without producing any corresponding strain on the plate, C. The great heat from the fire is liable to soon burn out or injure that part of the top plate which is immediately in rear of it. By making this part separate from the rest and applying it thereto as described it will only be necessary to renew such movable part when it may be burned or cracked, it serving as a means of safety to the plate, C.

In rear of the back of each oven is a narrow chamber, x, opening into the bottom and side flues, such chamber being for the reception of heat from the flues in order to keep the end of the oven properly heated.

The advantages of the above described mode of making the upright flue leading from the fireplace or boiling chamber to the oven flues, are that by such it is extended at top the whole length of each oven and is capable of receiving as much, if not more smoke at its bottom part than it can discharge at its top. Besides this, its back is employed as a reflector of heat, throwing the same up against the protector plate forming the bottom of the flue, G. By means of such a heat reflector, the lower part of the space directly over the protector plate will be heated so as not only to increase the draft around the ovens, but heat the lower parts of the inner sides of the ovens or those parts against which the current of smoke will not impinge while going down the diving flue, G. Furthermore, the mode of making the upright flue saves the necessity of extending its lower part backward into the brickwork S. It also renders the flue "self cleaning" as owing to its tapering sides the soot will fall therefrom or be burned from them in case it may collect thereon. The taper of the flue also affords more space for the back boilers.

The advantages of the curved valve N and recess, M, are as follows: 1st. There is but one damper required to control the flues of the two ovens. 2nd. It causes both the ovens to bake freely at the same time when the damper or valve is raised into the recess. 3rd. We are enabled to throw the current of smoke entirely about one oven only. 4th. The damper or valve N, in consequence of its form serves as an easy deflector of the heat and smoke while the same may be passing from a flue on top of one oven into the diving flue, G.

The advantages of the protector plate constituting the bottom of the flue G, are, that it serves to absorb the heat reflected from the back of the tapering upright flue and conduct such heat into the flue G in manner and for the purpose as described. It also serves to support the ovens and operates as a fender to protect their inner corners or edges from being burned. It also constitutes a bottom of the flue, G.

The advantages of the peculiar arrangement of flues about the two ovens and in rear of them, are, that when the heat is first applied to the bottoms of the ovens we can heat the ovens equally or particularly their tops and outer sides where the heat is most required, and where generally speaking, it is most difficult to obtain its effects to the best advantage. We also can heat both ovens equally, or we can have the currents of smoke pass around one of them only while a still body of heated gases or smoke is caused to rest against the bottom, the outer side and the top of the other oven, in which case, the latter oven may be used simply as a warming apartment, into which articles that had been previously cooked may be placed for being re-heated or kept warm.

In my experience as an inventor and manufacturer of cooking and heating apparatus for the last thirty years, I have never before seen any mode of applying heat to an oven by which a temperature so uniform throughout the entire interior of the oven could be produced. By my arrangement of flues, the heat is prevented from first passing up between the ovens, (which would cause their inner sides to become too hot), but passes underneath the ovens against their outer sides and thence over their tops and while passing over their tops it is forced to impinge against the said tops as it is being drawn down into the space between the ovens. The two flues meeting contain more area than the escape flue and thus cause the space directly over the tops of the ovens to act as a heat reservoir as each is being continually filled with highly heated flame, which rising faster than it can find vent through the escape flue causes the top of each oven to be heated equally with its sides. The smoke and heat from the fireplace are brought into immediate contact with the boiler and from thence pass up the upright flue to the ovens in a manner to insure as little waste of fuel as possible and effect the quickest and most uniform baking I have ever known accomplished by any cooking apparatus. In all my experience never before have I been able to arrange the flue of an oven (nor have I seen it done by others) in such manner when the heat was admitted at the bottom of the oven, that the two sides and top could be made to heat uniformly and especially the top as the heat would be drawn off to the chimney; but by my invention I am enabled not only to heat one, but two ovens at the same time and that uniformly, insuring the articles which may be baked in either or both an equal brown upon their upper and lower surfaces.

I lay no claim to the arrangement of ovens elevated chamber or shell and flues, as claimed in the United States Patent, numbered 11,295, as my invention or arrangement of flues and the mode of carrying the heat about the ovens differ essentially therefrom.

What I do claim is—

1. My improved arrangement of flues against the bottoms, the outer sides, the tops, the inner sides, and in rear of the two ovens whereby, the smoke after passing over the tops of the two ovens or either is made to descend between them and pass out into the back flue in manner as described.

2. And with the said arrangement of flues or the parts thereof to which the same especially belong, or in other words, the top and diving flues of the two ovens I claim the arrangement and application of a curved valve N, and its arched recess M, the whole being made to operate substantially in manner as above described.

3. I also claim the protector plate H, as combined and arranged with reference to the fireplace, the two ovens and the flue between the two ovens and so as to support the ovens as set forth.

4. I also claim the above described mode of making the upright flue D, leading from the fireplace or boiling chamber to the flue space about the oven, such flue being made with a reflector back and tapering sides and in other respects substantially as specified.

5. I also claim the expansion safety plate t, as arranged with respect to the fireplace and applied on the top plate of the boiling chamber in manner and for the purpose substantially as specified.

In testimony whereof, I have hereunto set my signature.

GARDNER CHILSON.

Witnesses:
R. H. EDDY,
F. P. HALE, Jr.